US009411169B2

(12) United States Patent
Park et al.

(10) Patent No.: US 9,411,169 B2
(45) Date of Patent: Aug. 9, 2016

(54) SCREEN AND LASER DISPLAY APPARATUS USING THE SAME

(71) Applicant: LG ELECTRONICS INC., Seoul (KR)

(72) Inventors: Woojae Park, Seoul (KR); Jaewook Kwon, Seoul (KR); Chanyoung Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/640,300

(22) Filed: Mar. 6, 2015

(65) Prior Publication Data

US 2016/0033785 A1 Feb. 4, 2016

(30) Foreign Application Priority Data

Aug. 1, 2014 (KR) ........................ 10-2014-0099284

(51) Int. Cl.
*G03B 21/56* (2006.01)
*G02B 27/48* (2006.01)
*G02B 5/02* (2006.01)
*G02B 6/08* (2006.01)

(52) U.S. Cl.
CPC .............. *G02B 27/48* (2013.01); *G02B 5/0221* (2013.01); *G02B 5/0263* (2013.01); *G03B 21/56* (2013.01); *G02B 6/08* (2013.01)

(58) Field of Classification Search
CPC .......... G03B 21/56; G02B 27/48; G02B 6/08; H04N 9/3147
USPC ................................................ 359/443, 460
See application file for complete search history.

(56) References Cited

U.S. PATENT DOCUMENTS

| 4,573,082 | A | * | 2/1986 | Jeskey ........................... 348/832 |
| 5,029,975 | A | | 7/1991 | Pease |
| 5,594,561 | A | * | 1/1997 | Blanchard ....................... 349/59 |
| 5,626,410 | A | * | 5/1997 | Chambers et al. ............... 353/94 |
| 5,851,740 | A | | 12/1998 | Sawyer |
| 2002/0085278 | A1 | * | 7/2002 | Kolosowsky ................... 359/460 |
| 2003/0151727 | A1 | * | 8/2003 | Glent-Madsen et al. ........ 353/94 |
| 2006/0176555 | A1 | * | 8/2006 | Kuo et al. ....................... 359/460 |
| 2007/0268578 | A1 | * | 11/2007 | Katase ............................ 359/460 |
| 2010/0118397 | A1 | | 5/2010 | Powell et al. |
| 2012/0155800 | A1 | | 6/2012 | Cottrell et al. |
| 2013/0010356 | A1 | | 1/2013 | Curtis et al. |

OTHER PUBLICATIONS

International Search Report issued in Application No. PCT/KR2015/001753 dated May 29, 2015.

* cited by examiner

*Primary Examiner* — Christopher Mahoney
(74) *Attorney, Agent, or Firm* — Ked & Associates, LLP

(57) ABSTRACT

There is disclosed a screen including a first diffusion plate for transmitting a laser light for image display, a second diffusion plate spaced apart a preset distance from the first diffusion plate, and a plurality of optical transmission tubes arranged between the first diffusion plate and the second diffusion plate to transfer the laser light transmitted from the first diffusion plate to the second diffusion plate, wherein the optical transmission tube includes a body portion comprising a first surface facing the first diffusion plate and a second surface facing the second diffusion plate, vided in the body portion to a central region of the second surface provided in the body portion, and at least one optical fiber arranged in the through hole to transfer the laser light, only to reduce speckle noise of laser, and a laser display apparatus using the same.

21 Claims, 22 Drawing Sheets

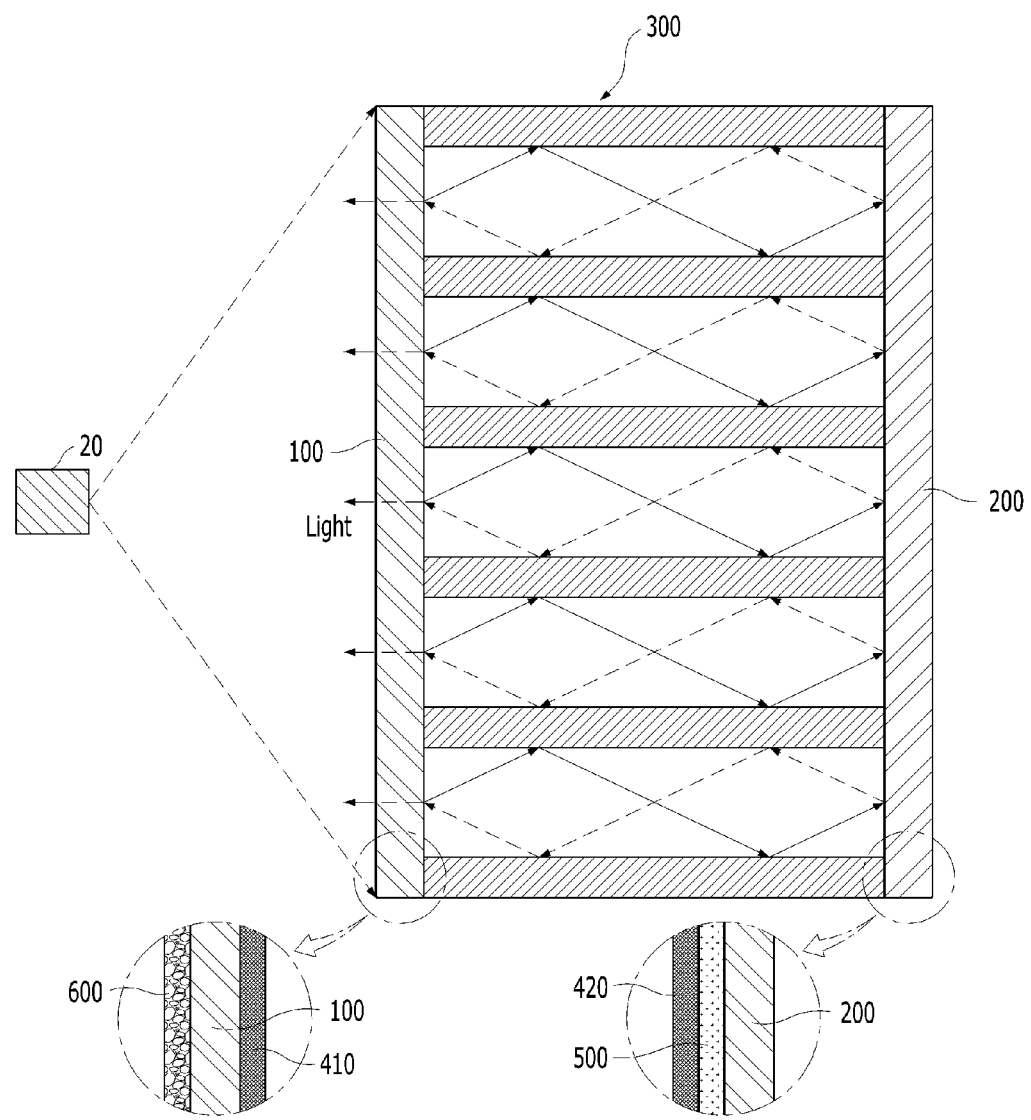

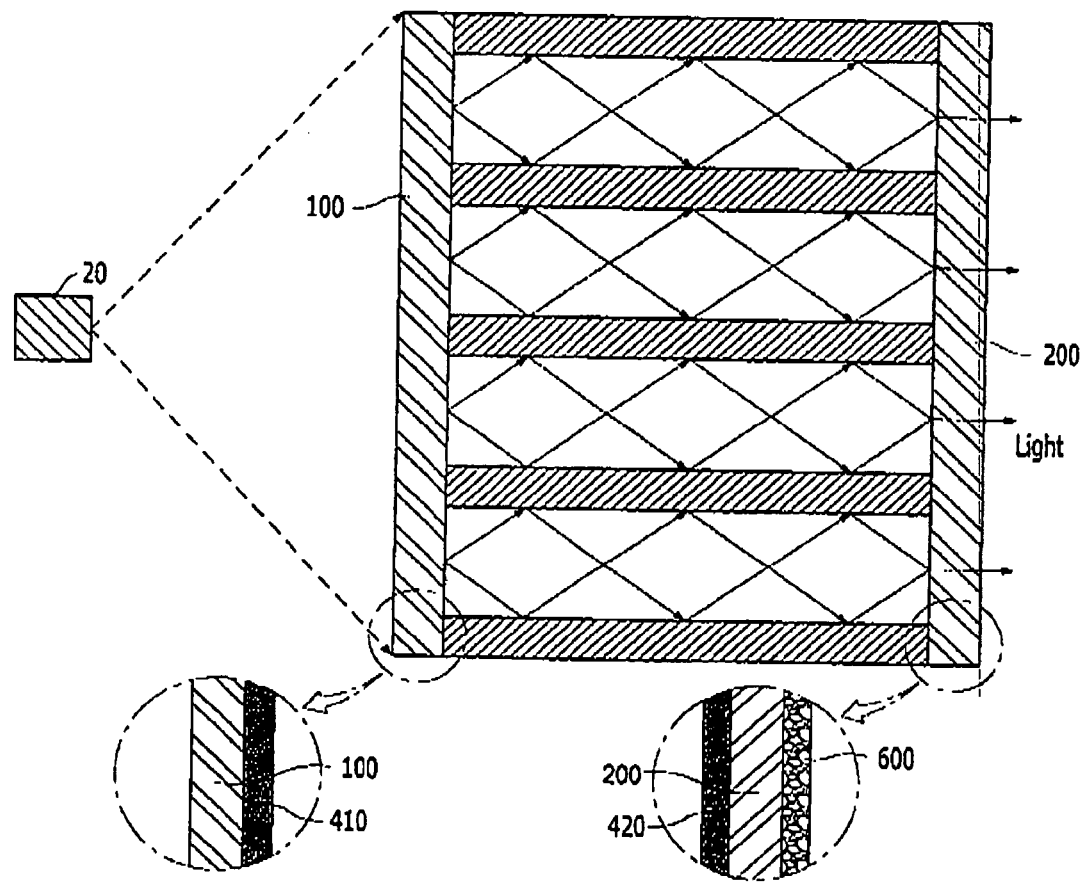

SCREEN AND LASER DISPLAY APPARATUS USING THE SAME

CROSS-REFERENCE TO RELATED APPLICATIONS

Pursuant to 35 U.S.C. §119(a), this application claims the benefit of earlier filing date and right of priority to Korean Application No. 10-2014-0099284, filed in Korea on Aug. 1, 2014, the contents of which are hereby incorporated by reference herein in their entirety.

BACKGROUND OF THE DISCLOSURE

1. Field of the Disclosure

Embodiments of the present disclosure relates to a screen, more particularly, to a screen which may reduce speckle noise of laser and a laser display apparatus using the same.

2. Background of the Disclosure

In general, rapid progress to a multimedia society requires enlargement and a high quality of a display screen. Recently, it is getting more important in a display screen to realize natural colors together with a high image resolution.

So as to realize perfect natural colors, it is essential to a light source having a high color purity (e.g., a laser). Examples of a device which realizes an image, using a laser, includes a laser display apparatus using an optical scanner.

Such a laser display apparatus (e.g., a laser projector) has a system for displaying an image through a screen to which an input image signal is scanned, using a laser beam emitted from a laser light source. The laser display apparatus is used in realizing presentation in a conference room, a film projector in a movie theater, a home theater, and so on.

However, when projecting an image to a screen, using a laser light source, characteristics of laser cause grain-shaped speckles on a screen and such speckles can be the reason for remarkable deterioration of an image.

The laser having a characteristic of coherency may cause interference, while penetrating an irregular surface, only to generate speckles on the screen.

To reduce such speckles of the laser, a conventional laser display apparatus includes diverse elements for reducing the speckles. However, an overall size of the laser display apparatus is increased and an optical system structure is complex, such that there can be a limit to downsizing of the laser display apparatus.

Accordingly, there are increasing demands for a screen which may reduce speckle noise of a laser, with easy realization, and which may be applied to a small laser display apparatus as well as a large laser display apparatus.

SUMMARY OF THE DISCLOSURE

An object of the present disclosure is to provide a screen which may increase sharpness thereof and also reduce speckle noise of a laser by arranging an optical transmission tube having at least one optical fiber between two diffusion plates, and a laser display apparatus using the same.

To achieve these objects and other advantages and in accordance with the purpose of the disclosure, as embodied and broadly described herein.

Embodiments of the present disclosure may provide a screen including a first diffusion plate for transmitting a laser light for image display; a second diffusion plate spaced apart a preset distance from the first diffusion plate; and a plurality of optical transmission tubes arranged between the first diffusion plate and the second diffusion plate to transfer the laser light transmitted from the first diffusion plate to the second diffusion plate, wherein the optical transmission tube includes a body portion comprising a first surface facing the first diffusion plate and a second surface facing the second diffusion plate; a through hole penetrated from a central region of the first surface provided in the body portion to a central region of the second surface provided in the body portion; and at least one optical fiber arranged in the through hole to transfer the laser light.

The body portion of the optical transmission tube may be formed of a light blocking material.

A cross sectional area of the through hole provided in the optical transmission tube may be equal to a cross sectional area of one pixel provided in the image.

One optical fiber may be arranged in the through hole of the optical transmission tube, and an outer surface of the optical fiber is in contact with the body portion of the optical transmission tube.

A plurality of optical fibers may be arranged in the through hole of the optical transmission tube, and a space formed between neighboring optical fibers may be filled with a light blocking material.

The optical fiber may include a core for transferring the laser light; and a clad layer for surrounding an outer surface of the core, and the thickness of the clad layer is smaller than the thickness of the body portion of the optical transmission tube.

The distance between the first diffusion plate and the second diffusion plate may be 1 mm or more.

Embodiments of the present disclosure may also provide a laser display apparatus using a screen including a laser projector for emitting a laser light for image display; and a screen for displaying by transmitting or reflecting the laser light emitted from the laser projector, wherein the screen includes first and second diffusion plates spaced apart a preset distance from each other; and a plurality of optical transmission tubes arranged between the first diffusion plate and the second diffusion plate to transfer the laser light transmitted from the first diffusion plate to the second diffusion plate, and the optical transmission tube includes a body portion comprising a first surface facing the first diffusion plate and a second surface facing the second diffusion plate; a through hole penetrated from a central region of the first surface provided in the body portion to a central region of the second surface provided in the body portion; and at least one optical fiber arranged in the through hole to transfer the laser light.

BRIEF DESCRIPTION OF THE DRAWINGS

Arrangements and embodiments may be described in detail with reference to the following drawings in which like reference numerals refer to like elements and wherein:

FIGS. 15 and 16 are diagrams illustrating a laser display apparatus using the screen in accordance with the present disclosure;

DESCRIPTION OF SPECIFIC EMBODIMENTS

Suffixes of elements such as "module" and "unit" which are used in the following description are used in consideration of easy specification creation and they are not distinguished from each other.

Examples of a laser projection display described in the present disclosure may include a projector including a laser light source, a micro-display and a micro optical device and so on.

For example, such a laser projection display may be applied to a mobile terminal. Examples of a mobile terminal may include a cellular phone, a smart phone, a laptop computer, PDA (Personal Digital Assistants), PMP (Portable Multimedia Player), Navigation, a slate PC, a tablet PC, a ultrabook, a wearable device (e.g., a smartwatch), a smart glass, HMD (Head Mounted Display) and so one.

However, Configurations of embodiments of the present disclosure may be applied to a fixed terminal (e.g., a digital TV, a desktop computer, a digital signage) except embodiments applicable only to a mobile terminal.

Figure 1:
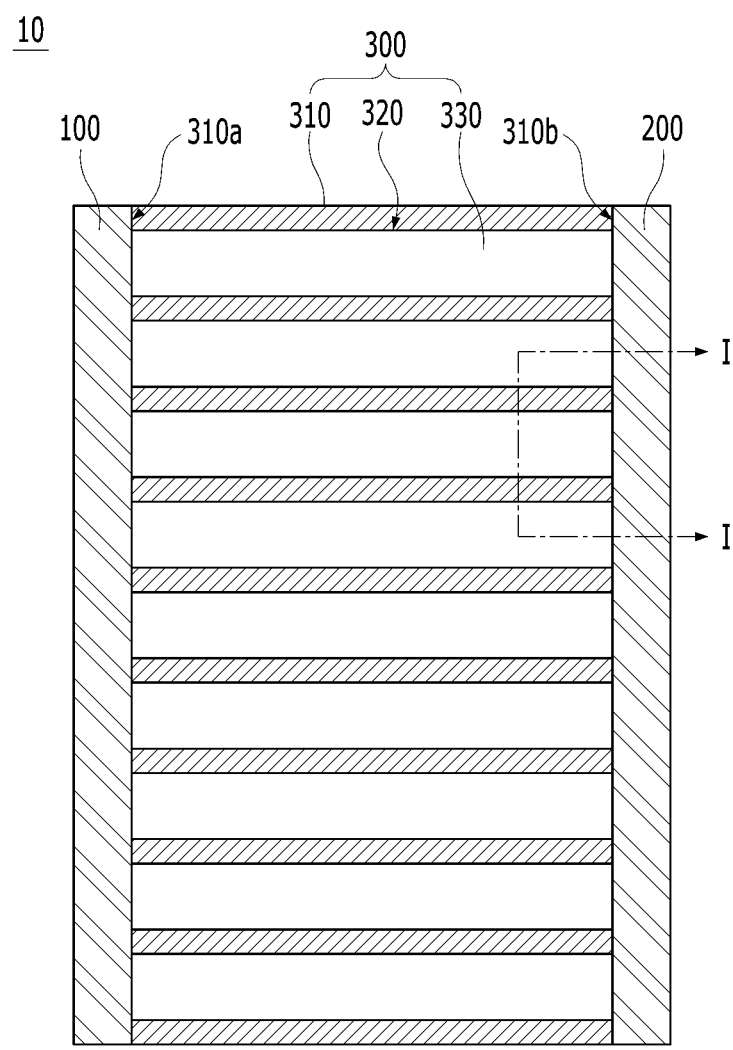
FIG. 1 is a sectional diagram illustrating a screen in accordance with one embodiment of the present disclosure.

FIG. 1 is a sectional diagram illustrating a screen in accordance with one embodiment of the present disclosure.

The screen 10 shown in FIG. 1 may include first and second diffusion plates 100 and 200 and a plurality of optical transmission tubes 300.

The first diffusion plate 100 may transmit a laser light for displaying an image and the second diffusion plate 200 may be spaced apart a preset distance from the first diffusion plate 100.

For example, the distance between the first diffusion plate 100 and the second diffusion plate 200 can be approximately 1 mm or more.

If the distance between the first diffusion plate 100 and the second diffusion plate 200 is approximately less than 1 mm, speckle noise could increase.

A bead layer for optical diffusion may be formed in a front surface of the first diffusion plate 100 where the laser light is incident and a first adhesion layer may be formed in a rear surface facing the optical transmission tube 300.

If necessary, the bead layer formed in the front surface of the first diffusion plate 100 may be omitted and the first adhesion layer formed in the rear surface of the first diffusion plate 100 may be also omitted.

The thickness of the first diffusion plate 100 may be equal to or different from that of the bead layer.

For example, the thickness of the first diffusion plate 100 may be approximately 1 mm~2 mm.

Alternatively, the thickness of the first diffusion plate 100 may be different from the thickness of the bead layer and the first adhesion layer. The thickness of the bead layer may be different from that of the first adhesion layer.

The thicknesses of the first diffusion plate 100, the bead layer and the first adhesion layer may affect brightness of an image. The thicknesses may be designed in consideration of brightness of a displayed image.

Next, a bead layer for optical diffusion may be formed in a front surface of the second diffusion plate 200 and a second adhesion layer for adhesion of the optical transmission tube 300 may be formed in a rear surface facing the optical transmission tube 300.

As the case may be, a reflection layer for reflecting light toward the first diffusion plate 100 again may be formed in the second diffusion plate 200, together with the second adhesion layer for the adhesion of the optical transmission tube 300.

The bead layer formed in the front surface of the second diffusion plate 200 may be omitted and the second adhesion layer formed in the rear surface of the second diffusion plate 200 may be also omitted.

The thickness of the second diffusion plate 200 may be equal to or different from that of the bead layer.

For example, the thickness of the second diffusion plate 200 may be approximately 1 mm~2 mm Alternatively, the thickness of the second diffusion plate 200 may be different from the thickness of the bead layer and the second adhesion layer. The thickness of the bead layer may be different from that of the second adhesion layer.

The thicknesses of the second diffusion plate 200, the bead layer and the second adhesion layer may affect brightness of an image. The thicknesses may be designed in consideration of brightness of a displayed image.

The thickness of the first diffusion plate 100 may be equal to or different from the thickness of the second diffusion plate 200, as the case may be.

Alternatively, an optical diffusion rate of the first diffusion plate 100 may be equal to or different from an optical diffusion rate of the second diffusion plate 200, as the case may be.

A screen may be modified and fabricated in accordance with a structure and type of a laser display apparatus.

For example, when the size of a bead provided in the bead layer formed in the first diffusion plate 100 is different from the size of a bead provided in the bead layer formed in the second diffusion plate 200, the optical diffusion rate of the first diffusion plate 100 may be different from the optical diffusion rate of the second diffusion plate 200.

The first adhesion layer of the first diffusion plate 100 and the second adhesion layer of the second diffusion plate may be formed of the same material or they may be formed of different materials, as the case may be.

For example, an adhesive strength of the first adhesion layer formed in the first diffusion plate 100 may be different from an adhesive strength of the second adhesion layer formed in the second plate 200.

The first diffusion plate 100 may transmit the incident laser light to the optical fiber 330 of the optical transmission tube 300. The second diffusion plate 200 may reflect the laser light incident through the optical fiber 330 toward the first diffusion plate 200 or transmit the laser light incident through the optical fiber 330.

Meanwhile, the plurality of the optical transmission tubes 300 may be arranged between the first diffusion plate 100 and the second diffusion plate 200, to transmit the laser light transmitted from the first diffusion plate 100 to the second diffusion plate 200.

At this time, each of the optical transmission tubes 300 may include a body portion 310 having a first surface 310a facing the first diffusion plate 100 and a second surface 310b facing the second diffusion plate 200, a through hole 320 penetrated to a central region of the second surface 310b from a central region of the first surface 310a of the body portion 310, and at least one optical fiber 330 arranged in the through hole 320 to transmit the laser light.

The body portion 310 of the optical transmission tube 300 may be formed of a light blocking material.

For example, the body portion 310 of the optical transmission tube 300 may be formed of at least one of carbon black, titanium oxide, iron oxide, chromium, silver, calcium carbonate and zinc oxide.

That is because optical loss of the incident laser light has to be reduced as much as possible.

The thickness of the body portion 310 provided in the optical transmission tube 300 may be approximately several micro meters to dozens of micro meters.

If the thickness is too small, the light could escape outside only to generate optical loss. If the thickness is too large, the amount of the incident light is too small and the brightness of the image can deteriorate.

The first surface 310a of the body portion 310 provided in the optical transmission tube 300 may be spaced apart a first distance from the first diffusion plate 100. The second surface 310b of the body portion 310 provided in the optical transmission tube 300 may be spaced apart a second distance from the second diffusion plate 200.

An adhesion layer may be formed between the first distance and the second distance.

A cross sectional area of the through hole 320 formed in the optical transmission tube 300 may be equal to an area of one pixel provided in the displayed image.

One optical fiber 330 may be arranged in the through hole 320 of the optical transmission tube 300 and an outer surface of the optical fiber 330 may be in contact with the body portion 310 of the optical transmission tube 300.

Alternatively, a plurality of optical fibers 330 may be arranged in the through hole 320 of the optical transmission tube 300 and a light blocking material may be filled in a space formed between two neighboring optical fibers 330.

For example, approximately 1~5 optical fibers 330 may be arranged in the through hole 320 of the optical transmission tube 300.

The number of the optical fibers 330 arranged in each of the optical transmission tubes 300 may be uniform.

If the number of the optical fibers 330 is differentiated, overall brightness of the image cannot be uniform and the quality of the image might deteriorate.

A rate of the number of pixels provided in the image to the number of the optical fibers may be 1:1~1:20.

In the present disclosure, the optical transmission tube having at least one optical fiber is arranged between the first diffusion plate and the second diffusion plate, such that the speckle noise of the laser may be reduced and that sharpness of the screen may be enhanced as well.

The reason why the speckle noise of the laser can be reduced by arranging the optical transmission tube having the at least one optical fiber between the first and second diffusion plates will be described in detail as follows.

Figure 2:
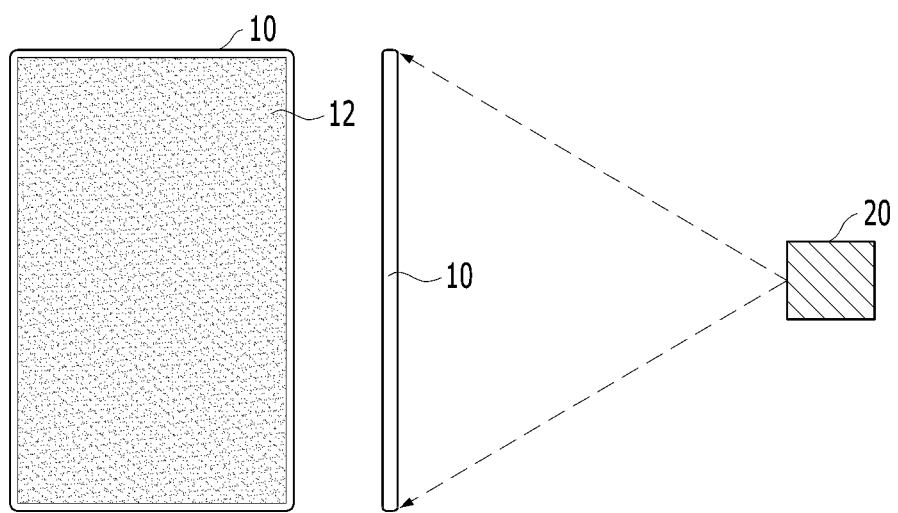
FIGS. 2 through 4 are diagrams illustrating a cause of speckle noise occurrence.
Figure 3:
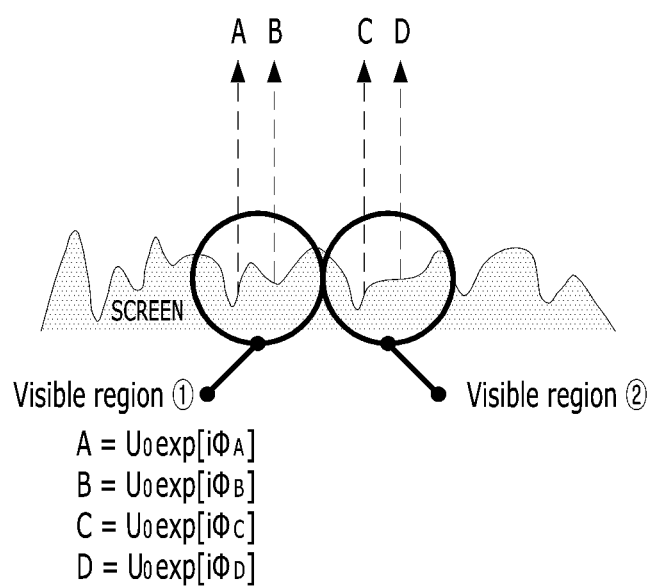
Figure 4:
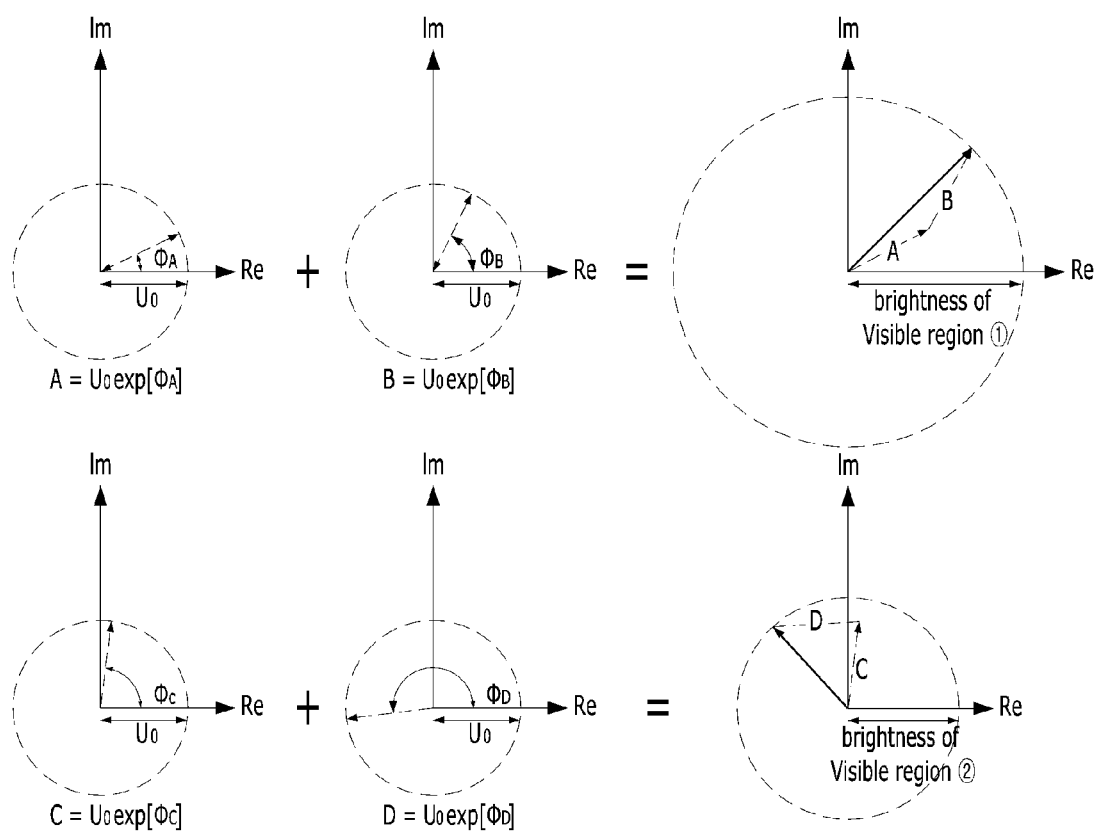

FIGS. 2 through 4 are diagrams illustrating a cause of speckle noise occurrence.

As shown in FIG. 2, a laser projector 20 using laser as a light source involves speckle noise 12 on a screen 10, when projecting an image to the screen 10.

Such speckle noise is a phenomenon that brightness of minimum regions decomposable by human eyes look different from each other and the speckle noise is caused by coherency of the laser.

For example, when the laser is projected to the screen, an uneven surface of the screen makes a phase of light differentiated as shown in FIGS. 3 and 4.

In other words, there are first and second visible regions as minimum regions decomposable by human eyes and there are A and B lasers which are reflected from the first visible region as shown in FIG. 3. When a phase diagram of A and B is illustrated as shown in FIG. 4, a phase of laser A is different from a phase of laser B.

When the phases of laser A and B are synthesized, brightness of the first visible region is shown.

There are laser C and D which are reflected from the second visible region. When a phase diagram of laser C and D is illustrated as shown in FIG. 4, a phase of laser C is different from a phase of laser D.

When the phases of laser C and D are synthesized, brightness of the second visible region is shown.

However, it is known that the brightness of the first visible region is different from the brightness of the second visible region.

The brightness of the first visible region is different from that of the second visible region adjacent to the first visible region such that a viewer may see speckle noise.

To remove such speckle noise, there are diverse methods and examples of the diverse methods include phase diversity, spatial averaging, wavelength diversity, polarization diversity, temporal averaging, angular diversity and so on.

In the phase diversity method, a diffusion plate is arranged on a light-emitting surface of a laser light source and the diffusion plate is rotated. In the spatial averaging, a laser light source is spatially vibrated or a screen and display surface is vibrated.

In the wavelength diversity, a laser light source having emission peaks of diverse wavelengths is used. In the polarization diversity, polarization of the laser light source is changed.

In the temporal averaging, different speckle patterns are displayed at a preset speed too rapid for human eyes to distinguish. In the angular diversity, a screen is fabricated, using a thick diffusion plate or a plurality of diffusion plates.

However, it is difficult for an apparatus using the methods mentioned above to reduce the speckle noise much enough for a viewer not to recognize.

Accordingly, many apparatuses using the methods mentioned above can reduce the speckle noise, in case that they are integrated into a single apparatus.

When the several apparatuses are integrated into one apparatus, downsizing and integration is not easy to achieve and there is a limit to the application of the integrated apparatus to a product such as a small-sized laser projector.

It may be more advantageous to use the method for fabricating a screen, using the thick diffusion plate or the plural diffusion plates than the method for integrating the apparatuses so as to downsize and integrate the overall system.

However, the method for fabricating the screen, using the thick diffusion plate or the plural diffusion plates, has an effect of simple realization and another one of speckle reduction. But, the method has a disadvantage of brightness deterioration and it is difficult to apply the method to a real product.

As the diffusion plate is getting thicker and thicker and as a distance between the diffusion is getting increasing more and more, the phase diversity may get increasing more and more.

As a haze of the diffusion plate is getting higher, the angular diversity which means that angular elements are diversified may get increasing more.

As the phase diversity and the angular diversity are getting increasing more and more, the effect of reducing the speckle noise may get increasing more.

Figure 5:
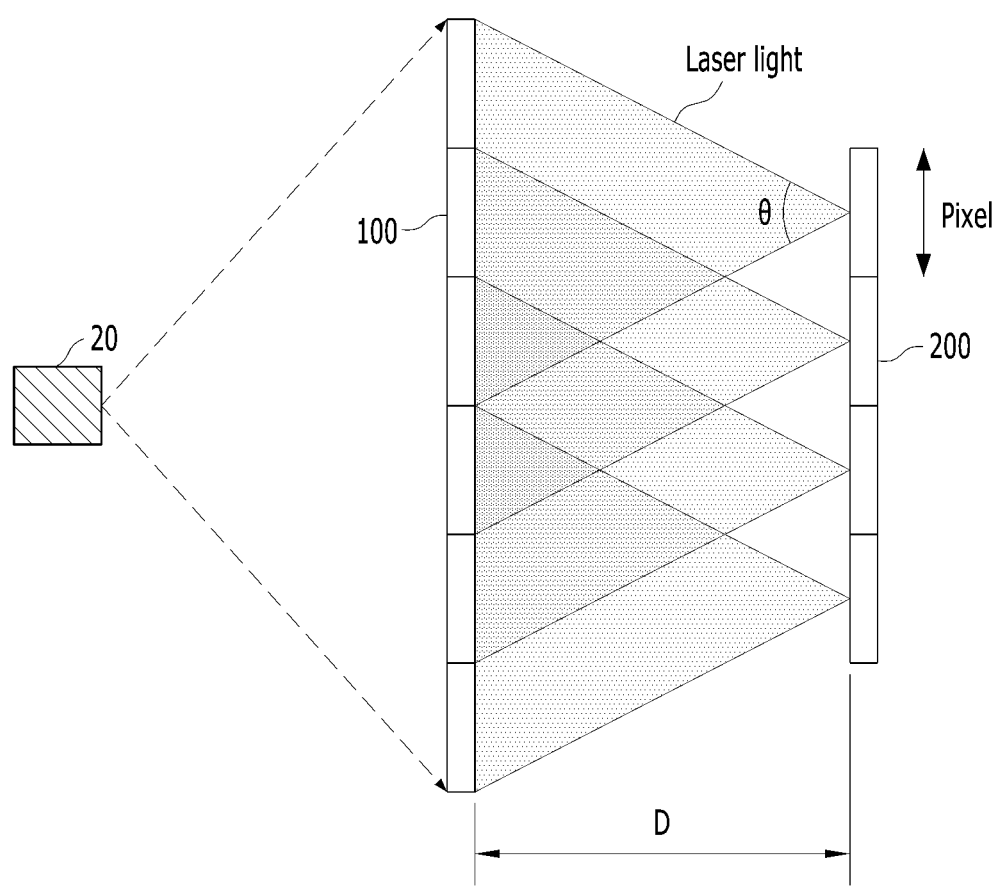
FIG. 5 is a diagram illustrating a screen using two diffusion plates.

FIG. 5 is a diagram illustrating a screen using two diffusion plates. As shown in FIG. 5, a first diffusion plate 100 and a second diffusion plate 200 may be spaced apart a predetermined distance (D) from each other. In this instance, the laser light emitted from the projector 20 passes the first and second diffusion plates 100 and 200 and the phase diversity and the angular diversity increase only to reduce speckle.

Table 1 shows speckle contrast based on a distance between the diffusion plates.

TABLE 1

|  | A distance between diffusion plates (mm) | Speckle contrast (%) |
| --- | --- | --- |
| One diffusion plate |  | 56.6 |
| Two diffusion plates | 0 | 25.06 |
|  | 0.5 | 16.1 |
|  | 1.6 | 7.86 |

In case of using one diffusion plate, speckle contrast is 56.6%. In case of using two diffusion plates, speckle contrast is reduced much.

The case of using the two diffusion plates spaced apart a preset distance from each other can reduce the speckle contrast more than the case of using the two diffusion plates bonded to each other thickly.

However, when the two diffusion plates are spaced apart from each other as shown in FIG. 5, the light incident on a first pixel of the first diffusion plate 100 might affect other neighboring pixels before incident on a first pixel of the second diffusion plate 200. Accordingly, overall sharpness could deteriorate.

When passing from the first diffusion plate 100 to the second diffusion plate 200, the laser light is partially lost and the optical loss could deteriorate the overall sharpness.

Therefore, when the optical transmission tube 300 is arranged between the first diffusion plate 100 and the second diffusion plate 200 as mentioned in the embodiment shown in FIG. 1, the phase diversity and the angular diversity may increase and then the speckle may be reduced. Also, the light incident on each of the pixels is blocked from affecting neighboring pixels and even the sharpness can be enhanced.

Figure 6:
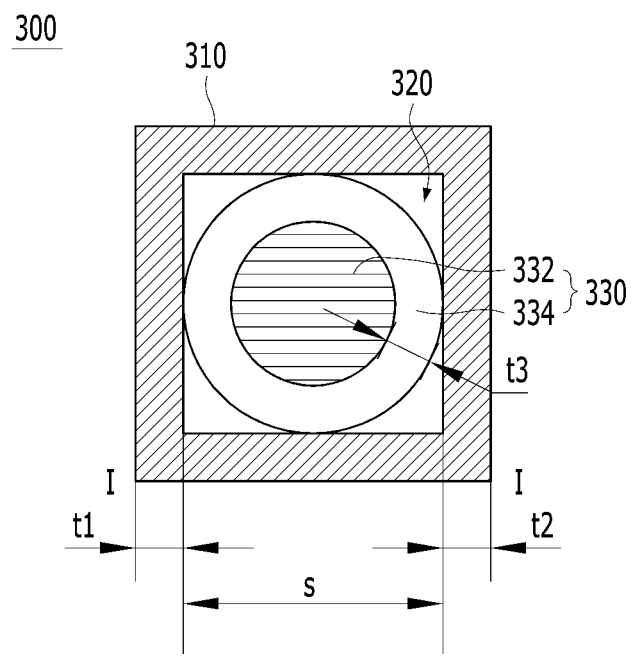
FIG. 6 is a sectional diagram along I-I line of FIG. 1.
Figure 7:
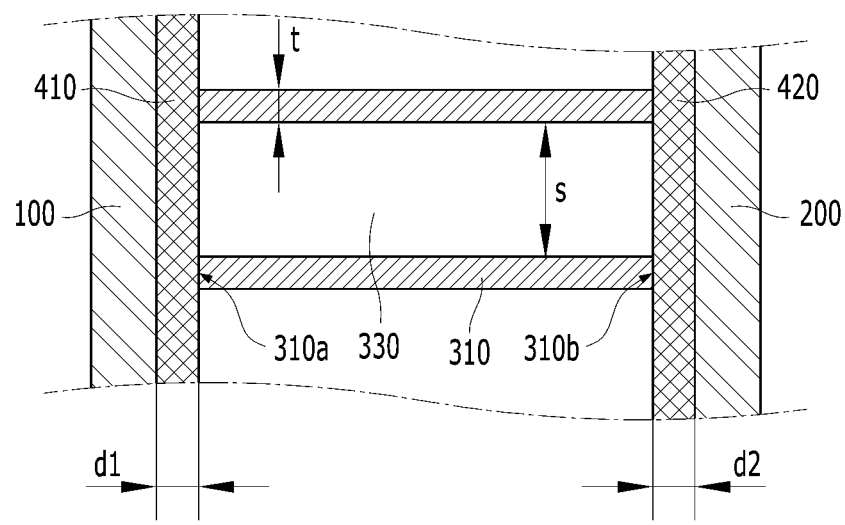
FIG. 7 is a diagram specifically illustrating an optical transmission tube of FIG. 1.

FIG. 6 is a sectional diagram along I-I line of FIG. 1 and FIG. 7 is a diagram specifically illustrating an optical transmission tube of FIG. 1.

As shown in FIGS. 6 and 7, the optical transmission tube 300 may include a body portion 310, a through hole 320 and an optical fiber 330.

At this time, the body portion 310 of the optical transmission tube 300 may be formed of a light blocking material. For example, the body portion 310 of the optical transmission tube 300 may be formed of at least one of carbon black, titanium oxide, iron oxide, chromium, silver, calcium carbonate and zinc oxide, and the present disclosure is not limited thereto.

For example, a cross sectional shape of the body portion 310 may be rectangular and it may be polygonal such as pentagonal or hexagonal.

Corresponding to pixel arrangement of an image, the plurality of the optical transmission tubes 300 may be arranged in close contact.

At this time, a cross sectional shape of the through hole 320 may be also equal to the cross sectional shape of the body portion.

The thicknesses (t1, t2) of the body portion 310 may be approximately several micrometers~dozens of micrometers. The thicknesses of t1 and t2 may be equal to or different from each other.

In other words, the thickness of the body portion 310 may be uniform and a predetermined surface of the body portion has a different thickness.

The cross sectional area (S) of the through hole may be equal to an area of one pixel provided in the displayed image.

Accordingly, a rate of the number of the pixels in the image to the number of the optical transmission tubes 300 may be 1:1.

One optical fiber 330 may be arranged in the through hole 320 or a plurality of optical fibers 330 may be arranged therein.

The optical fiber 330 may include a core 332 for transmitting the laser light and a clad layer 334 for surrounding an outer surface of the core 332. The thickness (t3) of the clad layer 334 is smaller than the thicknesses (t1 and t2) of the body portion 310 provided in the optical transmission tube 300.

That is because the area of the core for transmitting the laser light has to be increased to enhance the brightness of the image.

When one optical fiber 330 is arranged in the through hole 320, the outer surface of the optical fiber 330 may be in contact with the body portion 310 of the optical transmission tube 300.

At this time, in case there is a space between the outer surface of the optical fiber 330 and the body portion 310 of the optical transmission tube 300, a light-blocking material may be filled in the space.

As the case may be, the space formed between the outer surface of the optical fiber 330 and the body portion 310 of the optical transmission tube 300 may be an air gap.

Alternatively, in case a plurality of optical fibers 330 are arranged in the through hole 320 of the optical transmission tube 300, a light-blocking material may be filled in a space formed between two neighboring optical fibers 330.

As the case may be, the space formed between each two of the optical fibers 330 may be an air gap.

Approximately 1~5 optical fibers 330 are arranged in the through hole 320 and the present disclosure is not limited thereto.

If five or more optical fibers 330 are arranged in one through hole 320, production cost might rise and work processes could be difficult.

A rate of the number of the pixels in the image to the number of the optical fibers 330 may be 1:1~1:20.

The number of the optical fibers 330 arranged in on optical transmission tube 300 may be applied to all of the optical transmission tubes 300.

If a different number of optical fibers 330 are provided in each of the optical transmission tubes 300, the overall brightness of the image fails to be uniform and the image quality could deteriorate.

The body portion 310 of the optical transmission tube 300 shown in FIG. 7 may include a first surface 310a facing the first diffusion plate 100 and a second surface 310b facing the second diffusion plate 200. The thickness of the body portion 310 provided in the optical transmission tube 300 may be approximately several micro meters to dozens of micro meters.

If the thickness is too small, the light could escape outside only to generate optical loss. If the thickness is too large, the amount of the incident light is too small and the brightness of the image can deteriorate.

The first surface 310a of the body portion 310 provided in the optical transmission tube 300 may be spaced apart a first distance (d1) from the first diffusion plate 100. The second surface 310b of the body portion 310 provided in the optical transmission tube 300 may be spaced apart a second distance (d2) from the second diffusion plate 200.

A first adhesion layer 410 may be formed in the first distance (d1) and a second adhesion layer 420 may be formed in the second distance (d2).

At this time, the first distance (d1) may be equal to the second distance (d2). The first distance (d1) may be different from the second distance (d2), as the case may be.

If the first distance (d1) is different from the distance (d2), the thickness of the first adhesion layer 410 may be different from that of the second adhesion layer 420.

Figure 8:
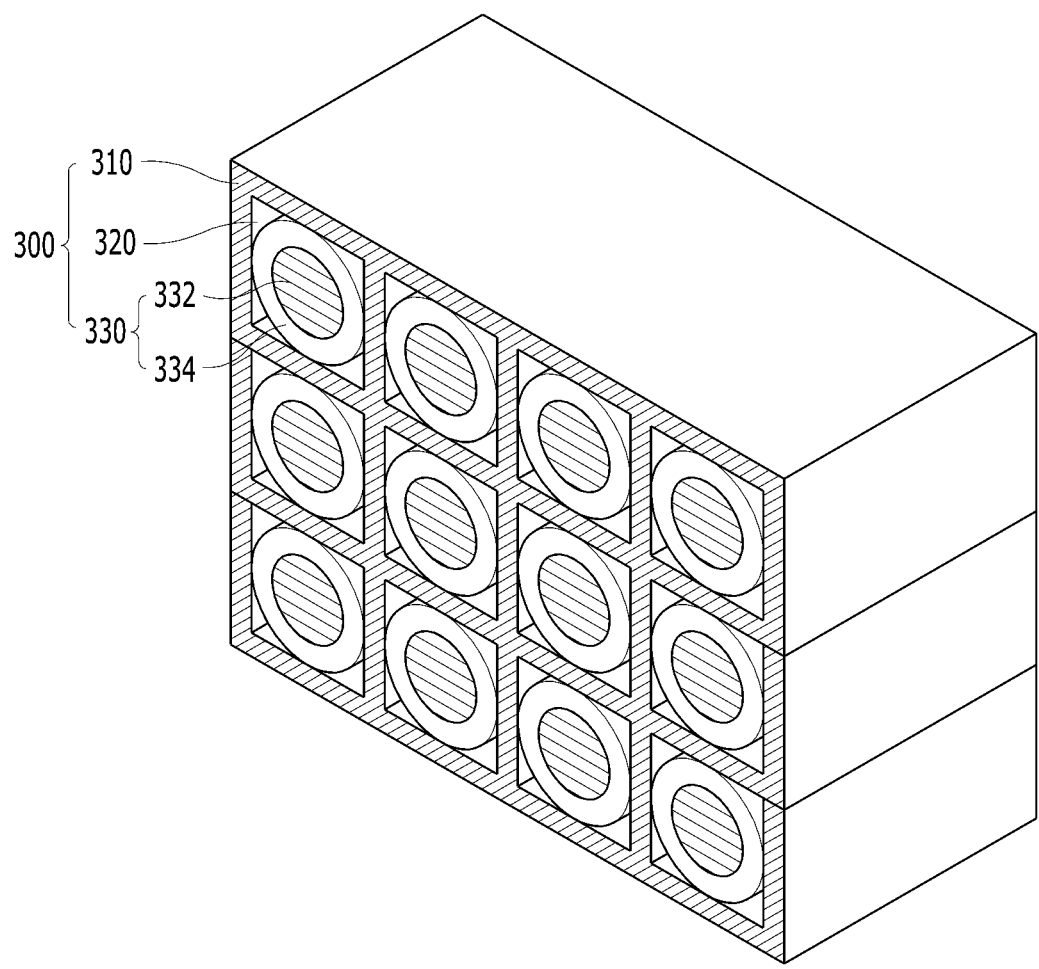
FIG. 8 is a perspective diagram illustrating the optical transmission tube of FIG. 1.

FIG. 8 is a perspective diagram illustrating the optical transmission tube of FIG. 1.

The optical transmission tube 300 shown in FIG. 8 may include the body portion 310, the through hole 320 and the optical fiber 330.

The optical fiber 330 may include a core 332 for transmitting the laser light and a clad layer 334 for surrounding an outer surface of the core 332.

For example, a cross sectional shape of the body portion 310 provided in the optical transmission tube 300 may be rectangular and it may be polygonal such as pentagonal or hexagonal.

Corresponding to pixel arrangement of an image, the plurality of the optical transmission tubes 300 may be arranged in close contact.

At this time, a cross sectional shape of the through hole 320 may be also equal to the cross sectional shape of the body portion.

Approximately 1~5 optical fibers 330 are arranged in the through hole 320 and the present disclosure is not limited thereto.

As shown in FIG. 8, the plurality of the optical transmission tubes 300 may be arranged in a matrix type. The pixels of the image and the optical transmission tubes 300 may be arranged in one to one correspondence.

A rate of the number of the pixels in the image to the number of the optical transmission tubes 300 may be 1:1.

Figure 9A:
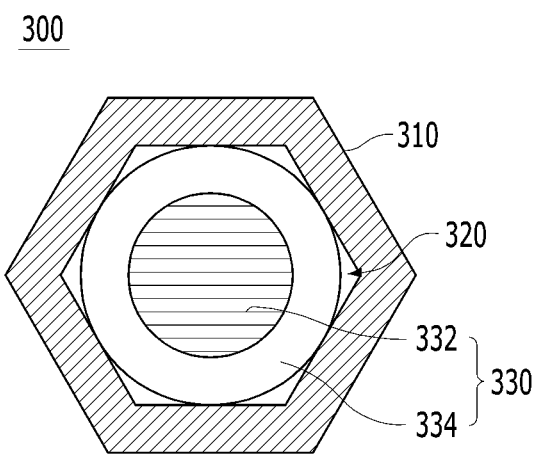
FIGS. 9A and 9B are a sectional diagram illustrating diverse cross sectional shapes of the optical transmission tube.
Figure 9B:
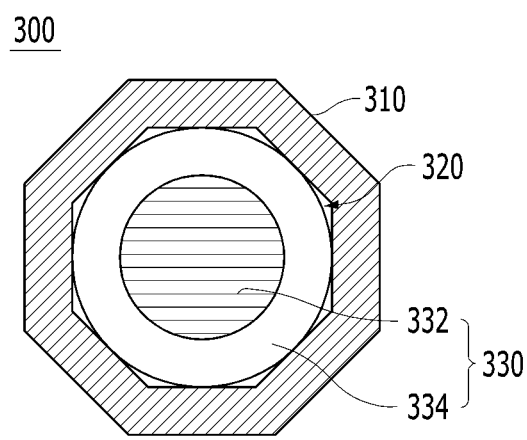

FIGS. 9A and 9B are a sectional diagram illustrating diverse cross sectional shapes of the optical transmission tube.

A cross sectional shape of the body portion 310 provided in the optical transmission tube 300 may be not only rectangular but also polygonal such as pentagonal, hexagonal or octagonal.

The body portion 310 of the optical transmission tube 300 may have a polyhedral shape, with a polygonal cross sectional shape.

Corresponding to the pixel arrangement of the image, the plurality of the optical transmission tubes 300 can be arranged in close contact.

FIG. 9A is a diagram illustrating one embodiment showing a hexagonal shaped optical transmission tube 300 and FIG. 9B is a diagram illustrating one embodiment showing an octagonal shaped optical transmission tube 300.

In this instance, a cross sectional shape of the through hole 320 formed in the optical transmission tube 300 may be also equal to the cross sectional shape of the optical transmission tube 300 or a cross sectional shape of the optical fiber 330 as the case may be.

At this time, the body portion 310 of the optical transmission tube 300 may be formed of a light blocking material. For example, the body portion 310 of the optical transmission tube 300 may be formed of at least one of carbon black, titanium oxide, iron oxide, chromium, silver, calcium carbonate and zinc oxide, and the present disclosure is not limited thereto.

When the optical fiber 330 is arranged in the through hole 320, an empty space inside the through hole 320 may be filled with a light blocking material. For Example, the light blocking material may include at least one of carbon black, titanium oxide, iron oxide, chromium, silver, calcium carbonate and zinc oxide, and the present disclosure is not limited thereto.

The light blocking material provided in the body portion 310 of the optical transmission tube 300 may be equal to the light blocking material filled in the empty space of the through hole 320 or the light blocking material of the body portion 310 may be different from the light blocking material filled in the empty space of the through hole 320 as the case may be.

For example, a light blocking rate of the light blocking material used for the body portion 310 may be higher than a light blocking rate of the light blocking material filled in the through hole 320.

Accordingly, the light blocking material of the body portion 310 may be different from the light blocking material of the through hole 320.

The optical fiber 330 may include a core 332 for transmitting the laser light and a clad layer 334 for surrounding an outer surface of the core 332. The thickness of the clad layer 334 is smaller than the thicknesses of the body portion 310 provided in the optical transmission tube 300.

That is because the area of the core for transmitting the laser light has to be increased to enhance the brightness of the image.

Figure 10A:
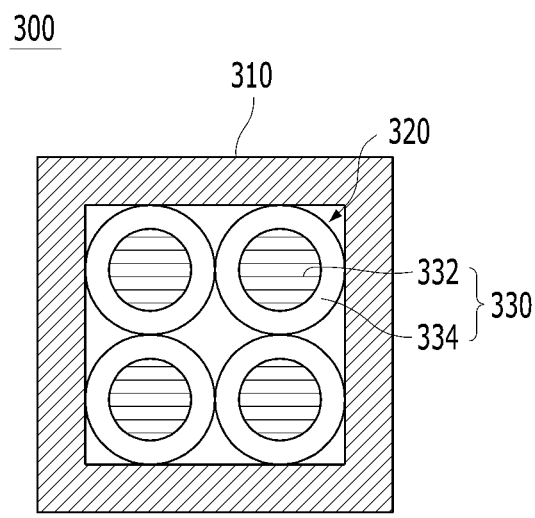
FIGS. 10A and 10B are a sectional diagram illustrating an optical transmission tube having a plurality of optical fibers.
Figure 10B:
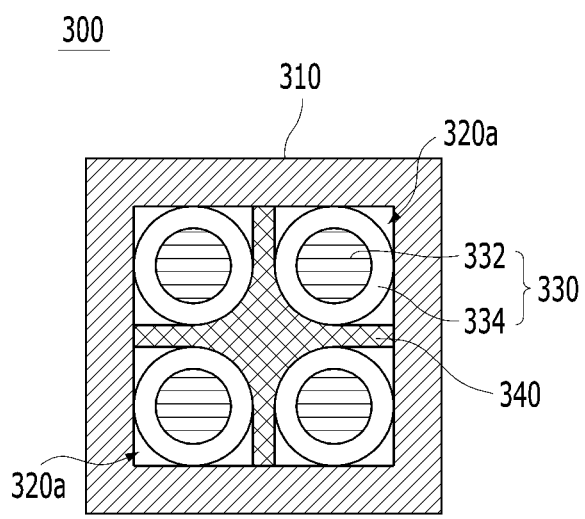

FIGS. 10A and 10B are a sectional diagram illustrating an optical transmission tube having a plurality of optical fibers.

The optical transmission tube 300 shown in FIGS. 10A and 10B may include the body portion 310, the through hole 320 and the optical fiber 330.

The optical fiber 330 may include a core 332 for transmitting the laser light and a clad layer 334 for surrounding an outer surface of the core 332.

A plurality of optical fibers 330 are arranged in the through hole 320 of the optical transmission tube 300 and a light-blocking material may be filled in a space formed between two neighboring optical fibers 330.

As the case may be, the space formed between each two of the optical fibers 330 may be an air gap.

For example, approximately 1~5 optical fibers 330 are arranged in the through hole 320 and the present disclosure is not limited thereto.

If five or more optical fibers 330 are arranged in one through hole 320, production cost might rise and work processes could be difficult.

As shown in FIG. 10A, a plurality of optical fibers 330 may be arranged along the through hole 320 of the optical transmission tube 300 in parallel. Alternatively, as shown in FIG. 10B, a partition wall 340 may be provided in the through hole 320 of the optical transmission tube 300 to arrange the plurality of the optical fibers 330 stably.

For example, the through hole 320 shown in FIG. 10B may be divided into a plurality of sub-holes 320a by the partition wall 340.

At this time, the partition wall 340 may be formed of a light blocking material. For example, the light blocking material may be at least one of carbon black, titanium oxide, iron oxide, chromium, silver, calcium carbonate and zinc oxide, and the present disclosure is not limited thereto.

At least one optical fiber 330 may be arranged in a sub-hole 320a divided by the partition wall 340.

For example, one optical fiber 330 may be arranged in the sub-hole 320a divided by the partition wall 340 or a plurality of optical fibers 330 may be arranged in the sub-hole 320a as the case may be.

The sub-hole 320a may be filled with a light blocking material or it may be an air gap.

The light blocking material of the sub-hole 320a, the light blocking material of the body portion 310 and the light blocking material of the partition wall 340 may be formed of the same material or different materials as the case may be.

For example, the light blocking material of the sub-hole 320a may be formed of a material which is different from the light blocking material of the body portion 310 and the light blocking material of the partition wall 340. The light blocking material of the body portion 310 and the light blocking material of the partition wall 340 may be formed of the same material.

In other words, the light blocking material of the sub-hole 320a may be formed of a material having a different light blocking rate from a light blocking rate of the light blocking material of the partition wall 340. The light blocking material of the body portion 310 and the light blocking material of the partition wall 340 may be formed of the same material having the same light blocking rate.

Figure 11A:
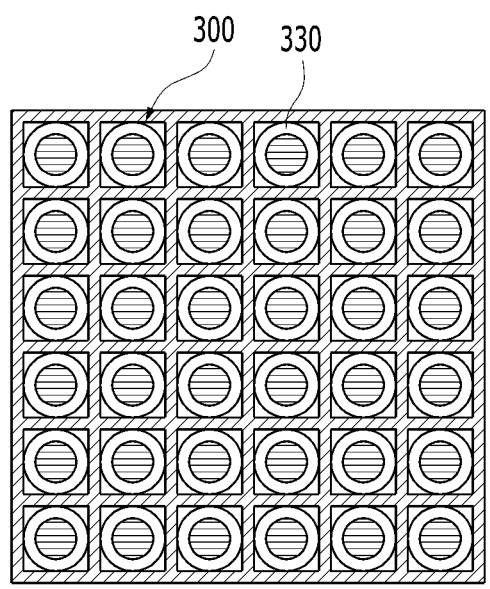
FIGS. 11A and 11B are a sectional diagram illustrating a relation of arrangement of optical transmission tubes having optical fibers.
Figure 11B:
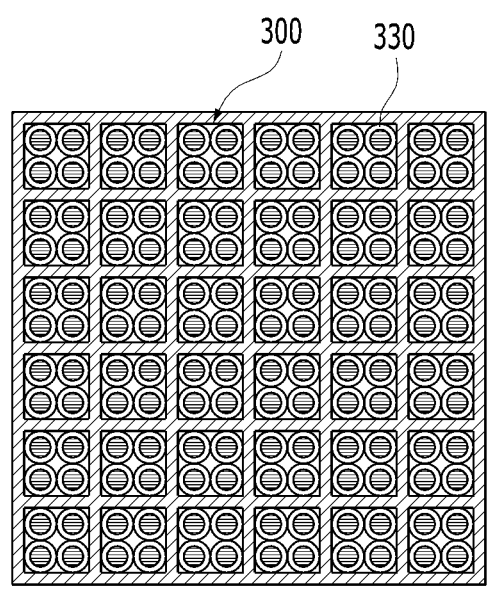

FIGS. 11A and 11B are a sectional diagram illustrating a relation of arrangement of optical transmission tubes having optical fibers.

As shown in FIGS. 11A and 11B, the plurality of the optical transmission tubes 300 may be arranged in a matrix type. The pixels of the image and the optical transmission tubes 300 may be arranged in one to one correspondence.

A rate of the number of the pixels in the image to the number of the optical transmission tubes 300 may be 1:1.

As shown in FIG. 11A, one optical fiber 330 may be arranged in one optical transmission tube 300. As shown in FIG. 11B, a plurality of optical fibers 330 may be arranged in one optical transmission tube 300.

If five or more optical fibers 330 are arranged in one through hole 320, production cost might rise and work processes could be difficult.

A rate of the number of the pixels in the image to the number of the optical fibers 330 may be 1:1~1:20.

The number of the optical fibers 330 arranged in on optical transmission tube 300 may be applied to all of the optical transmission tubes 300.

If a different number of optical fibers 330 are provided in each of the optical transmission tubes 300, the overall brightness of the image fails to be uniform and the image quality could deteriorate.

Figure 12:
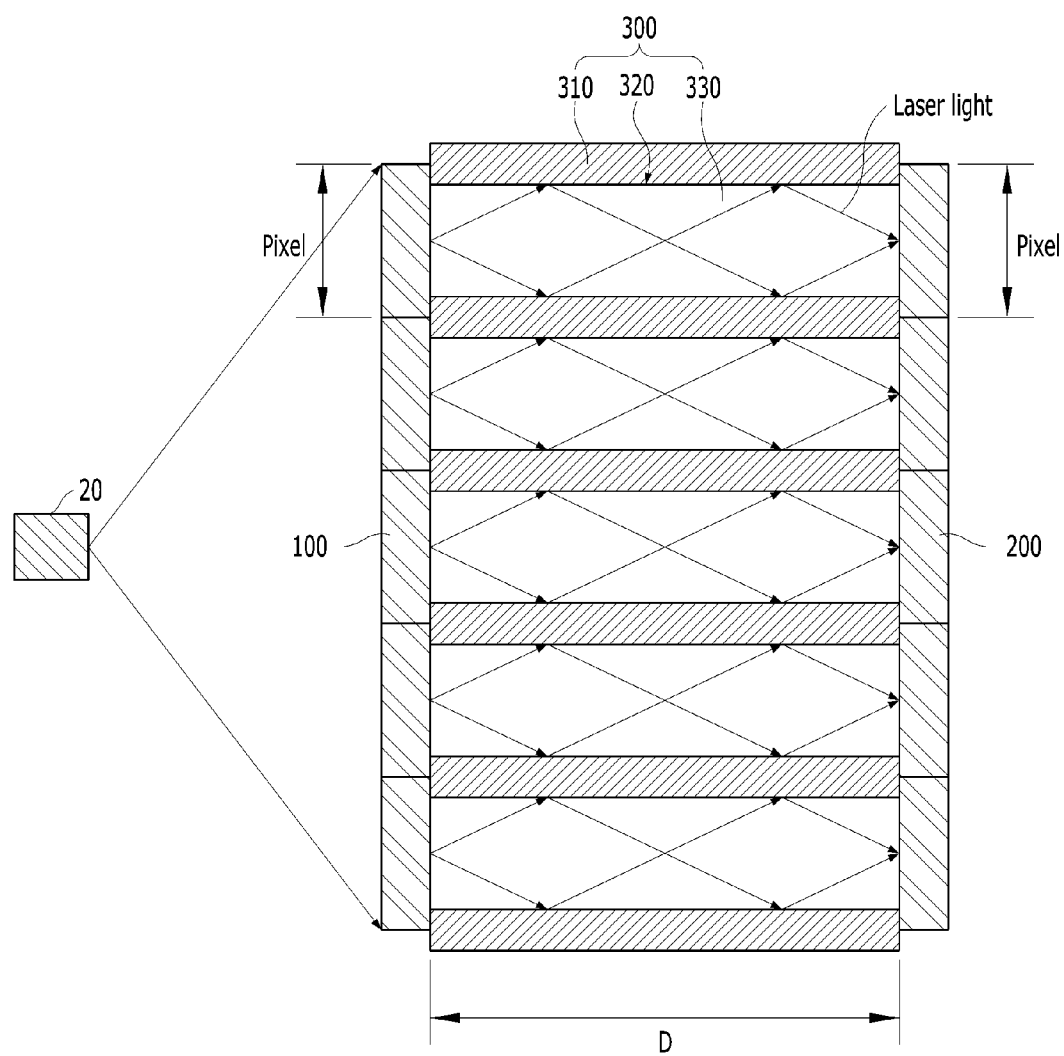
FIG. 12 is a diagram illustrating a relation of a distance between a first diffusion plate and a second diffusion plate which are shown in FIG. 1.

FIG. 12 is a diagram illustrating a relation of a distance between a first diffusion plate and a second diffusion plate which are shown in FIG. 1.

When a laser light for displaying an image is emitted from the laser projector 20, a first diffusion plate 100 of a screen shown in FIG. 12 may transmit the laser light for displaying the image and a second diffusion plate 200 spaced apart a preset distance from the first diffusion plate 100 may reflect or transmit the laser light transmitted from the first diffusion plate 100.

For example, the distance (D) between the first diffusion plate 100 and the second diffusion plate 200 can be approximately 1 mm or more.

If the distance (D) between the first diffusion plate 100 and the second diffusion plate 200 is approximately less than 1 mm, speckle noise could increase.

In the screen in accordance with the present disclosure, the distance (D) between the first diffusion plate 100 and the second diffusion plate 200 is approximately 1 mm or more and the speckle noise of the laser can be then reduced much. Also, the optical transmission tube 300 having at least one optical fiber 330 arranged in the through hole 320 of the body portion 310 may be provided between the first diffusion plate 100 and the second diffusion plate 200. Accordingly, the quality of the image may be enhanced, without sharpness deterioration of the screen.

The optical fiber 330 of the optical transmission tube 300 performs total reflection of the laser light incident by a pixel unit, without optical loss. Accordingly, the sharpness deterioration of the screen cannot be brought, even there is a far distance between the first diffusion plate 100 and the second diffusion plate 200.

The plurality of the optical transmission tubes 300 may be arranged in a matrix type. The pixels of the image and the optical transmission tubes 300 may be arranged in one to one correspondence.

In other words, a rate of the number of the pixels in the image to the number of the optical transmission tubes 300 may be 1:1.

Figure 13:
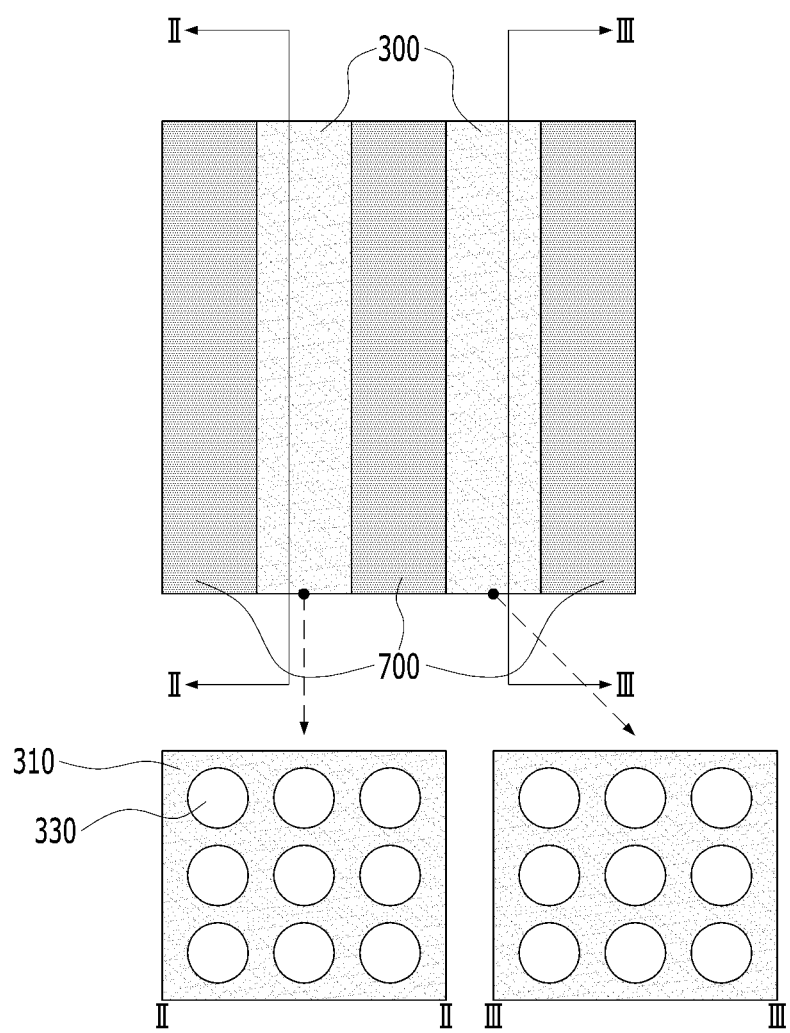
FIG. 13 is a sectional diagram illustrating a screen in accordance with another embodiment of the present disclosure.
Figure 14A:
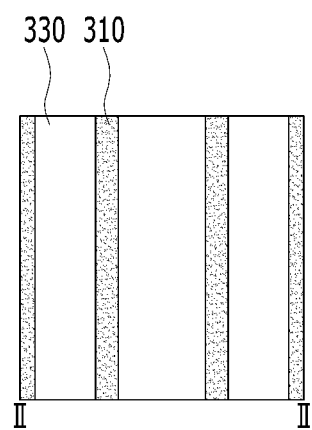
FIGS. 14A and 14B are a sectional diagram of an optical transmission tube along II-II of FIG. 13.
Figure 14B:
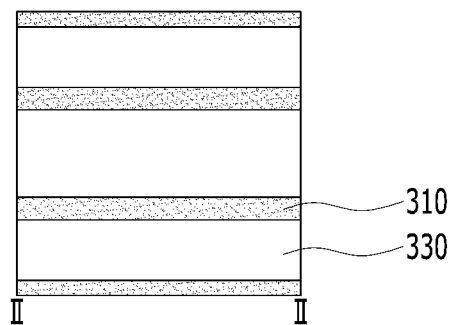

FIG. 13 is a sectional diagram illustrating a screen in accordance with another embodiment of the present disclosure and FIGS. 14A and 14B are a sectional diagram of an optical transmission tube along II-II of FIG. 13.

The screen 10 shown in FIG. 13 may include a plurality of diffusion plates 700 and a plurality of optical transmission tubes 300 arranged between the diffusion plates 700.

The plurality of the diffusion plates 700 may be spaced apart a preset distance from each other and an optical transmission tube 300 may be arranged between two neighboring diffusion plates 700.

For example, the distance between neighboring diffusion plates 700 can be approximately 1 mm or more.

The thicknesses of the diffusion plates 700 may be equal to each other or different from each other, as the case may be.

Alternatively, an optical diffusion rate of each diffusion plate 700 may be equal to or different from an optical diffusion rate of the second diffusion plate 200, as the case may be.

A screen may be modified and fabricated in accordance with a structure and type of a laser display apparatus.

Meanwhile, the plurality of the optical transmission tubes 300 may be arranged between the diffusion plates 700, respectively, to transfer the laser light transmitted from a diffusion plate 700 provided in a front end to a diffusion plate 700 provided in a rear end.

Each of the optical transmission tubes 300 may have a body portion 310 and a plurality of optical fibers 330 arranged in the body portion 310.

The body portion 310 of the optical transmission tube 300 may be formed of a light blocking material.

For example, the body portion 310 of the optical transmission tube 300 may be formed of at least one of carbon black, titanium oxide, iron oxide, chromium, silver, calcium carbonate and zinc oxide.

That is because optical loss of the incident laser light has to be reduced as much as possible.

A cross sectional shape of the body portion 310 provided in the optical transmission tube 300 may be not only rectangular but also polygonal such as pentagonal, hexagonal or octagonal.

A cross sectional shape of the through hole provided in the optical transmission tube 300 may be circular as shown in FIG. 13 or a stripe as shown in FIGS. 14A and 14B.

In other words, the cross sectional shape of the through hole formed in the optical transmission tube 300 may be a vertical stripe shape as shown in FIG. 14A or a horizontal stripe shape as shown in FIG. 14B.

Approximately 1~5 optical fibers 330 are arranged in the through hole 320 of the optical transmission tube 300 having diverse shapes.

The number of the optical fibers 330 arranged in each of the optical transmission tubes 300 may be uniform.

If the number of the optical fibers 330 is differentiated, the brightness of the overall image fails to be uniform and the quality of the image can then deteriorate.

A rate of the number of the pixels in the image to the number of the optical transmission tubes 300 may be 1:1.

A rate of the number of the pixels in the image to the number of the optical fibers may be 1:1~1:20

FIGS. 15 and 16 are diagrams illustrating a laser display apparatus using the screen in accordance with the present disclosure. FIG. 15 illustrates a forward image display type laser display apparatus and FIG. 16 illustrates a rearward image display type laser display apparatus.

The laser display apparatus shown in FIGS. 15 and 16 may include a laser projector 20 for emitting a laser light to display an image and a screen 10 for displaying an image by transmitting or reflecting the laser light emitted from the laser projector 20.

The screen 10 may include first and second diffusion plates 100 and 200 spaced apart a preset distance from each other, and a plurality of optical transmission tubes 300 arranged between the first and second diffusion plates 100 and 200 to transfer the laser light transmitted from the first diffusion plate 100 to the second diffusion plate 200.

At this time, each of the optical transmission tubes 300 may include a body portion 310 having a first surface 310*a* facing the first diffusion plate 100 and a second surface 310*b* facing the second diffusion plate 200, a through hole 320 penetrated to a central region of the second surface 310*b* from a central region of the first surface 310*a* of the body portion 310, and at least one optical fiber 330 arranged in the through hole 320 to transmit the laser light.

The forward image display type laser display apparatus shown in FIG. 15 may include a bead layer 600 for optical diffusion which is formed in the first diffusion plate 100 and a first adhesion layer 410 formed in a rear surface facing the optical transmission tube 300.

For example, the bead layer 600 for optical diffusion may be formed in a front surface of the first diffusion plate 100 where the laser light is incident and a first adhesion layer may be formed in a rear surface facing the optical transmission tube 300.

If necessary, the bead layer formed in the front surface of the first diffusion plate 100 may be omitted and the first adhesion layer formed in the rear surface of the first diffusion plate 100 may be also omitted.

The thickness of the first diffusion plate 100 may be equal to or different from that of the bead layer.

For example, the thickness of the first diffusion plate 100 may be approximately 1 mm~2 mm.

Alternatively, the thickness of the first diffusion plate 100 may be different from the thickness of the bead layer and the first adhesion layer. The thickness of the bead layer may be different from that of the first adhesion layer.

The thicknesses of the first diffusion plate 100, the bead layer and the first adhesion layer may affect brightness of an image. The thicknesses may be designed in consideration of brightness of a displayed image.

A reflection layer for reflecting light toward the first diffusion plate 100 again may be formed in the second diffusion plate 200, together with the second adhesion layer 420 for the adhesion of the optical transmission tube 300.

In other words, the second adhesion layer 420 for the adhesion of the optical transmission tube 300 may be formed in a rear surface of the second diffusion plate 200 which faces the optical transmission tube 300 and the reflection layer 500 for reflecting the light toward the first diffusion plate 100 again may be formed in the rear surface of the second diffusion plate 200 which faces the optical transmission tube 300.

As the case may be, a bead layer for optical diffusion may be further formed in a front surface of the second diffusion plate 200.

Alternatively, the bead layer formed in the front surface of the second diffusion plate 200 may be omitted and the second adhesion layer 240 formed in the rear surface of the second diffusion plate 200 may be also omitted.

At this time, the thickness of the second diffusion plate 200 may be equal to or different from that of the bead layer.

For example, the thickness of the second diffusion plate 200 may be approximately 1 mm~2 mm.

Alternatively, the thickness of the second diffusion plate 200 may be different from the thickness of the bead layer and the second adhesion layer. The thickness of the bead layer may be different from that of the second adhesion layer.

The thicknesses of the second diffusion plate 200, the bead layer and the second adhesion layer may affect brightness of an image. The thicknesses may be designed in consideration of brightness of a displayed image.

The thickness of the first diffusion plate 100 may be equal to or different from the thickness of the second diffusion plate 200, as the case may be.

Alternatively, an optical diffusion rate of the first diffusion plate 100 may be equal to or different from an optical diffusion rate of the second diffusion plate 200, as the case may be.

For example, when the size of a bead provided in the bead layer formed in the first diffusion plate 100 is different from the size of a bead provided in the bead layer formed in the second diffusion plate 200, the optical diffusion rate of the first diffusion plate 100 may be different from the optical diffusion rate of the second diffusion plate 200.

The first adhesion layer of the first diffusion plate 100 and the second adhesion layer of the second diffusion plate may be formed of the same material or they may be formed of different materials, as the case may be.

For example, an adhesive strength of the first adhesion layer formed in the first diffusion plate 100 may be different from an adhesive strength of the second adhesion layer formed in the second plate 200.

A screen may be modified and fabricated in accordance with a structure and type of a laser display apparatus.

In the forward image display type laser display apparatus shown in FIG. 15, the first diffusion plate 100 of the screen may transmit the incident laser light and transfer the laser light to the optical fiber of the optical transmission tube 300, when the laser light for image display is emitted from the laser projector 20. Then, the second diffusion plate 200 may reflect the laser light incident through the optical fiber toward the first diffusion plate 100 and the image can be displayed forwardly.

Meanwhile, the first adhesion layer 410 for adhesion of the optical transmission tube 300 may be formed in the first diffusion plate 100 of the screen in the rearward image display type laser display apparatus shown in FIG. 16.

In other words, the first adhesion layer 410 for the adhesion of the optical transmission tube 300 may be formed in a rear surface of the first diffusion plate 100 which faces the optical transmission tube 300.

As the case may be, a bead layer for light diffusion may be further formed in a front surface of the first diffusion plate 100.

Alternatively, the bead layer formed in the front surface of the first diffusion plate 100 may be omitted and even the first adhesion layer 410 formed in the rear surface of the first diffusion plate 100 may be omitted.

At this time, the thickness of the first diffusion plate 100 may be equal to or different from the thickness of the bead layer, as the case may be.

For example, the thickness of the first diffusion plate 100 may be approximately 1 mm~2 mm.

Alternatively, the thickness of the first diffusion plate 100 may be different from the thickness of the bead layer and the first adhesion layer 410. The thickness of the bead layer may be different from that of the first adhesion layer 410.

The thicknesses of the first diffusion plate 100, the bead layer and the first adhesion layer 410 may affect brightness of an image. The thicknesses may be designed in consideration of brightness of a displayed image.

A bead layer 600 for optical diffusion and a second adhesion layer 420 for adhesion of the optical transmission tube 300 may be formed in the second diffusion plate 200.

For example, a bead layer 600 for optical diffusion may be formed in a front surface of the second diffusion plate 200 and a second adhesion layer 420 for adhesion of the optical transmission tube 300 may be formed in a rear surface facing the optical transmission tube 300.

As the case may be, the bead layer 600 formed in the front surface of the second diffusion plate 200 may be omitted and the second adhesion layer 420 formed in the rear surface of the second diffusion plate 200 may be also omitted.

The thickness of the second diffusion plate 200 may be equal to or different from that of the bead layer 600.

For example, the thickness of the second diffusion plate 200 may be approximately 1 mm~2 mm.

Alternatively, the thickness of the second diffusion plate 200 may be different from the thickness of the bead layer 600 and the second adhesion layer 420. The thickness of the bead layer 600 may be different from that of the second adhesion layer 420.

The thicknesses of the second diffusion plate 200, the bead layer 600 and the second adhesion layer 420 may affect brightness of an image. The thicknesses may be designed in consideration of brightness of a displayed image.

The thickness of the first diffusion plate 100 may be equal to or different from the thickness of the second diffusion plate 200, as the case may be.

Alternatively, an optical diffusion rate of the first diffusion plate 100 may be equal to or different from an optical diffusion rate of the second diffusion plate 200, as the case may be.

For example, when the size of a bead provided in the bead layer formed in the first diffusion plate 100 is different from the size of a bead provided in the bead layer formed in the second diffusion plate 200, the optical diffusion rate of the first diffusion plate 100 may be different from the optical diffusion rate of the second diffusion plate 200.

The first adhesion layer of the first diffusion plate 100 and the second adhesion layer of the second diffusion plate may be formed of the same material or they may be formed of different materials, as the case may be.

For example, an adhesive strength of the first adhesion layer formed in the first diffusion plate 100 may be different from an adhesive strength of the second adhesion layer formed in the second plate 200.

A screen may be modified and fabricated in accordance with a structure and type of a laser display apparatus.

In the rearward image display type laser display apparatus shown in FIG. 16, the first diffusion plate 100 of the screen may transmit the incident laser light and transfer the laser light to the optical fiber of the optical transmission tube 300, when the laser light for image display is emitted from the laser projector 20. Then, the second diffusion plate 200 may transmit the laser light incident through the optical fiber and the image can be displayed rearward.

In the present disclosure, the optical transmission tube having at least one optical fiber may be arranged between the first and second diffusion plates such that the speckle noise of the laser can be reduced and that even sharpness of the screen can be enhanced.

Furthermore, in the present disclosure, only the structure of the screen is changed, with no other additional elements, and the speckle noise of the laser can be reduced. Accordingly, the laser display apparatus in accordance with the present disclosure may be applied to a large-sized laser display apparatus as well as a small-sized laser display apparatus.

Figure 17:
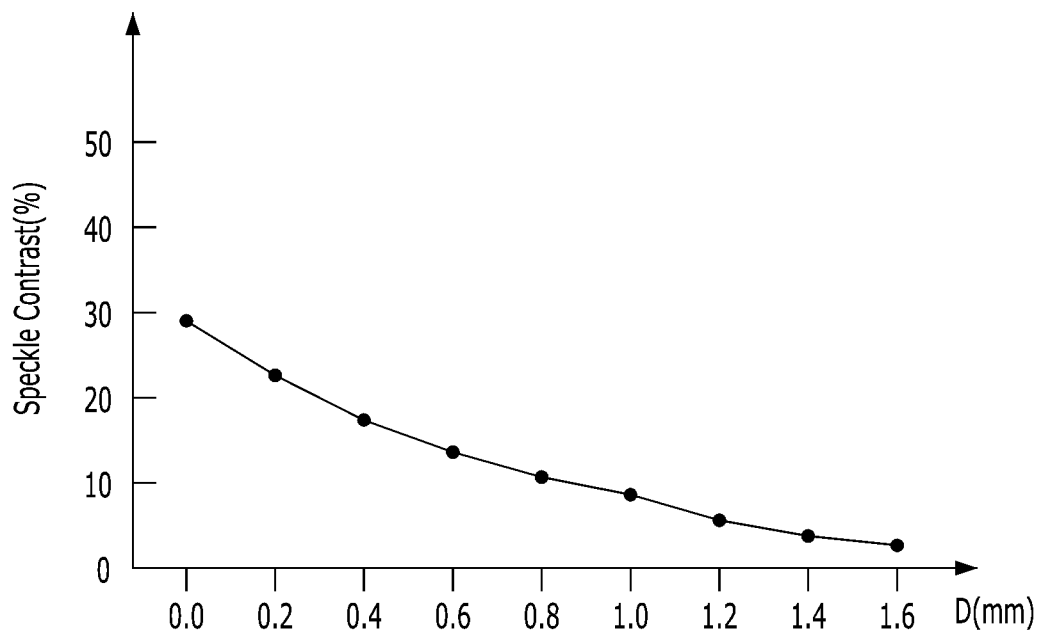
FIG. 17 is a graph illustrating speckle contrast based on a distance between first and second diffusion plates provided in the screen in accordance with the present disclosure.

FIG. 17 is a graph illustrating speckle contrast based on a distance between first and second diffusion plates provided in the screen in accordance with the present disclosure.

As shown in FIG. 17, it is shown the speckle noise of the laser is getting reduced more and more as the distance between the first and second diffusion plates provided in the screen is getting increased more and more.

When the distance (D) between the first diffusion plate and the second diffusion plate is approximately 1 mm or more, it is shown that speckle contrast is reduced down to 10% or less.

Accordingly, the distance (D) between the first diffusion plate and the second diffusion plate is approximately 1 mm or more in the screen in accordance with the present disclosure such that the speckle noise of the laser can be reduced remarkably.

Figure 18:
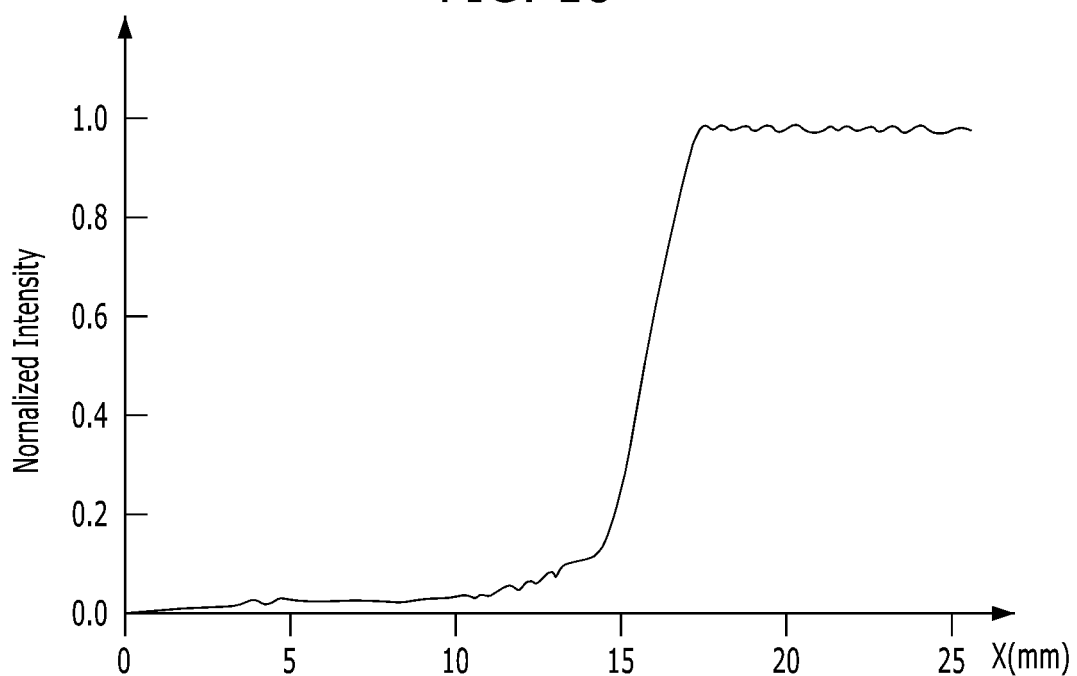
FIG. 18 is a graph illustrating speckle noise and sharpness of the screen in accordance with the present disclosure.

FIG. 18 is a graph illustrating speckle noise and sharpness of the screen in accordance with the present disclosure.

As shown in FIG. 18, wavelengths of the screen including the plurality of the optical transmission tubes having the optical fiber arranged between the first diffusion plate and the second diffusion plate may change drastically between a black image and a white image, when brightness distribution on the screen is measured for a sharpness experiment. As a gradient of the brightness distribution curve is getting steeper and steeper, the sharpness of the screen is enhanced more.

After the gradient of the brightness distribution curve is changed steep, the brightness distribution is performed normally, without a large vibration and it is known that the speckle noise of the laser is reduced.

Accordingly, the optical transmission tube having at least one optical fiber arranged in the through hole is arranged between the first diffusion plate and the second diffusion plate, such that the quality of the screen can be enhanced without deterioration of the sharpness of the screen.

Therefore, the distance between the first diffusion plate and the second diffusion plate is approximately 1 mm or more in the present disclosure, such that the speckle noise of the laser can be reduced remarkably. The optical transmission tube having the optical fiber is arranged between the first diffusion plate and the second diffusion plate, such that the quality of the image can be enhanced without deterioration of the screen sharpness.

At this time, the optical fiber of the optical transmission tube may totally reflect the laser light incident on each pixel unit. Accordingly, the deterioration of the screen sharpness cannot occur even when the first diffusion plate is far distant from the second diffusion plate.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A screen comprising:
    a first diffusion plate configured to transmit a laser light for image display,
    a bead layer for optical diffusion provided on the first diffusion plate;
    a second diffusion plate spaced apart a predetermined distance from the first diffusion plate; and
    a plurality of optical transmission tubes arranged between the first diffusion plate and the second diffusion plate to transfer the laser light from the first diffusion plate to the second diffusion plate,
    wherein at least one of the optical transmission tubes includes:
        a body portion including a first surface facing the first diffusion plate and a second surface facing the second diffusion plate;
        a through hole penetrated from a central region of the first surface provided in the body portion to a central region of the second surface provided in the body portion; and
        at least one optical fiber arranged in the through hole to transfer the laser light,
    wherein the first surface of the body portion provided in the at least one of the optical transmission tubes is spaced apart a first distance from the first diffusion plate such that an adhesion layer is provided between the first surface of the body portion and a first surface of the first diffusion plate, and wherein the bead layer is provided on a second surface of the first diffusion plate opposite the first surface of the first diffusion plate.

2. The screen of claim 1, wherein the body portion of the at least one of the optical transmission tubes is formed of a light blocking material.

3. The screen of claim 2, wherein the body portion of the at least one of the optical transmission tubes is formed of at least one of carbon black, titanium oxide, iron oxide, chromium, silver, calcium carbonate and zinc oxide.

4. The screen of claim 1, wherein a thickness of the body portion provided in the at least one of the optical transmission tubes is several micrometers~dozens of micrometers.

5. The screen of claim 1, wherein the second surface of the body portion provided in the at least one of the optical transmission tubes is spaced apart a second distance from the second diffusion plate such that an adhesion layer is provided between the second surface of the body portion and the second diffusion plate.

6. The screen of claim 1, wherein a cross sectional area of the through hole provided in the at least one of the optical transmission tubes is equal to a cross sectional area of one pixel provided in the image.

7. The screen of claim 1, wherein the through hole of the at least one of the optical transmission tubes is divided into a plurality of sub-holes by a preset partition wall.

8. The screen of claim 7, wherein the partition wall is formed of a light blocking material.

9. The screen of claim 7, wherein at least one optical fiber is arranged in a sub-hole divided by the partition wall.

10. The screen of claim 1, wherein one optical fiber is arranged in the through hole of the at least one of the optical transmission tubes, and
    an outer surface of the optical fiber is in contact with the body portion of the at least one of the optical transmission tubes.

11. The screen of claim 1, wherein a plurality of optical fibers are arranged in the through hole of the at least one of the optical transmission tubes, and
    a space formed between neighboring optical fibers is filled with a light blocking material.

12. The screen of claim 1, wherein the optical fiber includes:
    a core for transferring the laser light; and
    a clad layer for surrounding an outer surface of the core,
    wherein a thickness of the clad layer is smaller than a thickness of the body portion of the at least one of the optical transmission tubes.

13. The screen of claim 1, wherein 1~5 optical fibers are arranged in the through hole of the at least one of the optical transmission tubes.

14. The screen of claim 1, wherein a same number of the optical fibers is arranged in each of the optical transmission tubes.

15. The screen of claim 1, wherein a rate of a number of pixels of the screen to a number of the optical transmission tubes is 1:1.

16. The screen of claim 1, wherein a rate of a number of pixels of the screen to a number of the optical fibers is 1:1~1:20.

17. The screen of claim 1, wherein the distance between the first diffusion plate and the second diffusion plate is 1 mm or more.

18. The screen of claim 1, wherein the second diffusion plate reflects the laser light incident through the optical fiber toward the first diffusion plate or transmits the laser light incident through the optical fiber.

19. The screen of claim 1, further including a reflection layer provided on the second diffusion plate.

20. The screen of claim 1, wherein the bead layer is provided in a predetermined thickness to affect a brightness of an image.

21. A laser display apparatus using a screen, the apparatus comprising:
    a laser projector configured to emit a laser light for image display; and
    a screen configured to transmit or reflect the laser light emitted from the laser projector,
    wherein the screen includes:
        first and second diffusion plates spaced apart a predetermined distance from each other, wherein a bead layer for optical diffusion is provided on the first diffusion plate; and a plurality of optical transmission tubes arranged between the first diffusion plate and the second diffusion plate to transfer the laser light from the first diffusion plate to the second diffusion plate,
wherein at least one of the optical transmission tubes includes:
   a body portion including a first surface facing the first diffusion plate and a second surface facing the second diffusion plate;
   a through hole penetrated from a central region of the first surface provided in the body portion to a central region of the second surface provided in the body portion; and
   at least one optical fiber arranged in the through hole to transfer the laser light,
wherein the first surface of the body portion provided in the at least one of the optical transmission tubes is spaced apart a first distance from the first diffusion plate such that an adhesion layer is provided between the first surface of the body portion and a first surface of the first diffusion plate, and wherein the bead layer is provided on a second surface of the first diffusion plate opposite the first surface of the first diffusion plate.

* * * * *